United States Patent
Jung

(10) Patent No.: US 10,175,725 B2
(45) Date of Patent: Jan. 8, 2019

(54) FLEXIBLE DISPLAY APPARATUS AND IMAGE DISPLAY METHOD OF THE SAME

(71) Applicant: Samsung Display Co., Ltd., Yongin (KR)

(72) Inventor: Chansung Jung, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 780 days.

(21) Appl. No.: 14/259,682

(22) Filed: Apr. 23, 2014

(65) Prior Publication Data

US 2015/0153778 A1 Jun. 4, 2015

(30) Foreign Application Priority Data

Dec. 2, 2013 (KR) .......................... 10-2013-0148621

(51) Int. Cl.
*G09G 5/37* (2006.01)
*G06F 1/16* (2006.01)
(Continued)

(52) U.S. Cl.
CPC .......... *G06F 1/1652* (2013.01); *G06F 1/1677* (2013.01); *G06F 3/1446* (2013.01);
(Continued)

(58) Field of Classification Search
CPC .................................................. G06F 1/1652
See application file for complete search history.

(56) References Cited

U.S. PATENT DOCUMENTS 8,963,833 B2 * 2/2015 Yu ........................... G06F 3/041
178/18.01
8,963,857 B2 2/2015 Kim et al.
(Continued)

FOREIGN PATENT DOCUMENTS

CN 102150098 8/2011
CN 103376970 10/2013
(Continued)

OTHER PUBLICATIONS

Lahey et al., "PaperPhone: Understanding the Use of Bend Gestures in Mobile Devices with Flexible Electronic Paper Displays", CHI 2011, May 7-12, 2011, 10 pages.*
(Continued)

*Primary Examiner* — Srilakshmi K Kumar
*Assistant Examiner* — Karin Kiyabu
(74) *Attorney, Agent, or Firm* — H.C. Park & Associates, PLC

(57) ABSTRACT

A flexible display device includes a flexible display panel, a first sensor, a second sensor, and at least one control unit. The flexible display panel is bendable about an axis that divides the flexible display panel into a first portion and a second portion. The first sensor is configured to sense first spatial information of the first portion. The second sensor is configured to sense second spatial information of the second portion. The at least one control unit is configured to: determine bending information of the flexible display unit based on the first spatial information and the second spatial information; select an application according to the bending information; process image information through the application to generate image data; and drive the flexible display panel with the image data.

23 Claims, 11 Drawing Sheets

(51) Int. Cl.
*G06F 3/14* (2006.01)
*H04M 1/02* (2006.01)
*H04M 1/725* (2006.01)
*G09G 3/00* (2006.01)

(52) U.S. Cl.
CPC ............ *G09G 5/37* (2013.01); *H04M 1/0268* (2013.01); *H04M 1/72522* (2013.01); *G09G 3/003* (2013.01); *G09G 2300/026* (2013.01); *G09G 2320/0606* (2013.01); *G09G 2354/00* (2013.01); *G09G 2360/04* (2013.01); *G09G 2380/02* (2013.01); *H04M 1/0241* (2013.01)

(56) References Cited

U.S. PATENT DOCUMENTS

| | | | |
|---|---|---|---|
| 9,009,984 B2 | 4/2015 | Caskey et al. | |
| 9,589,529 B2 * | 3/2017 | Kim | G06F 3/147 |
| 9,672,796 B2 * | 6/2017 | Son | G09G 5/40 |
| 9,740,343 B2 | 8/2017 | Hotelling et al. | |
| 9,805,494 B2 * | 10/2017 | Hosoya | G06F 1/1652 |
| 2006/0034042 A1 * | 2/2006 | Hisano | G06F 1/1616 |
| | | | 361/679.04 |
| 2007/0075915 A1 * | 4/2007 | Cheon | G06F 1/1616 |
| | | | 345/1.1 |
| 2009/0303208 A1 * | 12/2009 | Case, Jr. | G06F 1/1616 |
| | | | 345/204 |
| 2010/0056223 A1 * | 3/2010 | Choi | G06F 1/1601 |
| | | | 455/566 |
| 2010/0064536 A1 * | 3/2010 | Caskey | G06F 1/1616 |
| | | | 33/303 |
| 2010/0182265 A1 * | 7/2010 | Kim | G06F 1/1616 |
| | | | 345/173 |
| 2011/0157050 A1 | 6/2011 | Jang et al. | |
| 2011/0216045 A1 * | 9/2011 | Tsuchida | G06F 1/1616 |
| | | | 345/204 |
| 2012/0249443 A1 * | 10/2012 | Anderson | A63F 13/06 |
| | | | 345/173 |
| 2012/0270653 A1 * | 10/2012 | Kareemi | A63F 13/10 |
| | | | 463/33 |
| 2013/0093660 A1 * | 4/2013 | Hirsch | G06F 1/1652 |
| | | | 345/156 |
| 2013/0120239 A1 * | 5/2013 | Suzuki | G06F 1/1643 |
| | | | 345/156 |
| 2013/0201115 A1 * | 8/2013 | Heubel | G06F 3/0487 |
| | | | 345/173 |
| 2013/0215041 A1 * | 8/2013 | Kim | G06F 3/0487 |
| | | | 345/173 |
| 2013/0215088 A1 * | 8/2013 | Son | G09G 5/40 |
| | | | 345/204 |
| 2013/0300732 A1 * | 11/2013 | Hosoya | G06F 1/1652 |
| | | | 345/419 |
| 2013/0335454 A1 * | 12/2013 | Birnbaum | G06F 3/016 |
| | | | 345/684 |
| 2014/0071043 A1 * | 3/2014 | Jung | G06F 3/03 |
| | | | 345/156 |
| 2014/0078046 A1 * | 3/2014 | Seo | G06F 1/1652 |
| | | | 345/156 |
| 2014/0078047 A1 * | 3/2014 | Seo | G06F 3/0487 |
| | | | 345/156 |
| 2014/0098028 A1 * | 4/2014 | Kwak | G09G 5/00 |
| | | | 345/173 |
| 2014/0101560 A1 * | 4/2014 | Kwak | G06F 1/1652 |
| | | | 715/738 |
| 2014/0184489 A1 * | 7/2014 | Ma | G09G 5/37 |
| | | | 345/156 |
| 2014/0218375 A1 * | 8/2014 | Kim | G06F 3/147 |
| | | | 345/501 |
| 2014/0364218 A1 * | 12/2014 | Holmgren | G01S 17/48 |
| | | | 463/31 |
| 2015/0316995 A1 * | 11/2015 | Tamaki | G06F 3/0487 |
| | | | 345/156 |
| 2016/0299578 A1 * | 10/2016 | Kim | G06F 3/0414 |
| 2016/0299579 A1 * | 10/2016 | Kim | G09G 5/006 |
| 2016/0306390 A1 * | 10/2016 | Vertegaal | G06F 1/1666 |
| 2016/0328017 A1 * | 11/2016 | Vertegaal | G06F 3/016 |
| 2017/0136350 A1 * | 5/2017 | Levesque | A63F 13/2145 |
| 2018/0032152 A1 * | 2/2018 | Pan | G06F 3/0485 |

FOREIGN PATENT DOCUMENTS

| | | |
|---|---|---|
| KR | 10-0611182 | 8/2006 |
| KR | 10-2011-0082359 | 7/2011 |
| KR | 10-1258327 | 4/2012 |
| KR | 10-1231106 | 2/2013 |
| KR | 10-2013-0067326 | 6/2013 |
| KR | 10-2013-0080937 | 7/2013 |
| WO | 2013/125745 | 8/2013 |

OTHER PUBLICATIONS

Ahmaniemi et al., "What is a Device Bend Gesture Really Good for?", CHI 2014, Apr. 26-May 1, 2014, 3503-3512.*

Office Action dated Oct. 8, 2018, in Chinese Patent Application No. 201410721341.8.

* cited by examiner

Fig. 9B
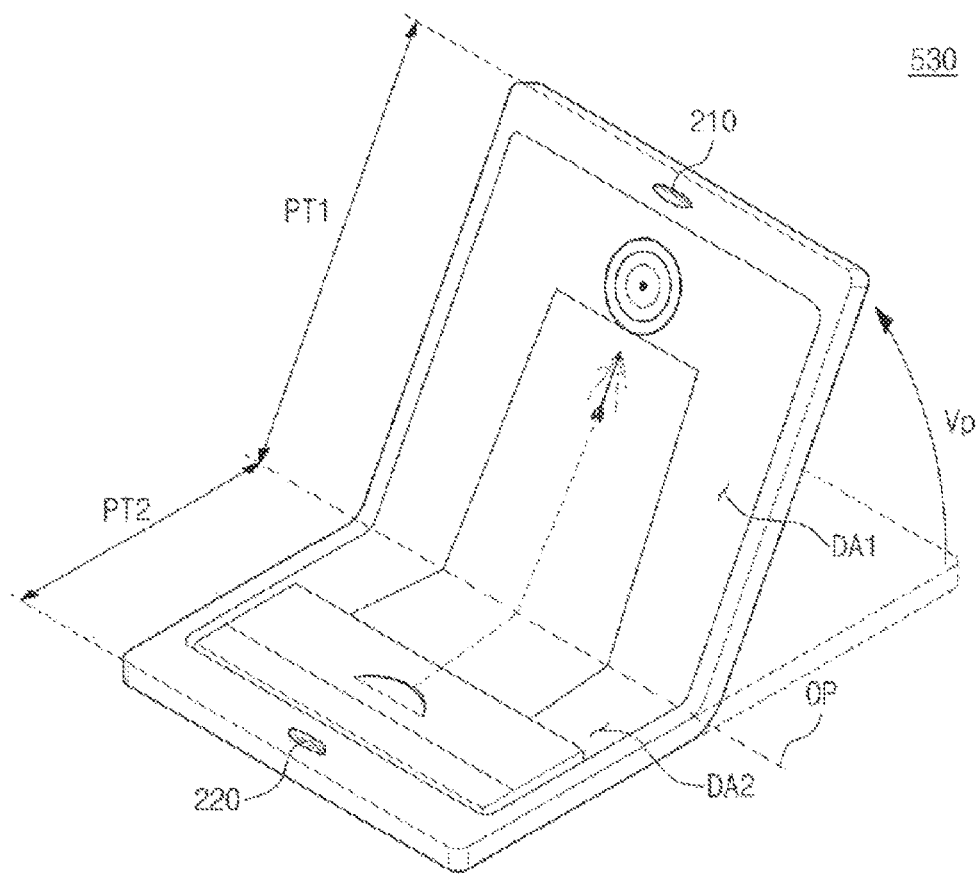
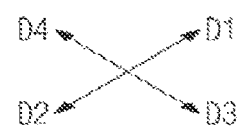

FLEXIBLE DISPLAY APPARATUS AND IMAGE DISPLAY METHOD OF THE SAME

CROSS-REFERENCE TO RELATED APPLICATION

This application claims priority from and the benefit of Korean Patent Application No. 10-2013-0148621, filed on Dec. 2, 2013, which is incorporated by reference for all purposes as if set forth herein.

BACKGROUND

Field

Exemplary embodiments relate to display technology, and, more particularly, to a flexible display device and an image display method of the flexible display device.

Discussion

Electronic devices, such as, for example, smart phones, digital cameras, notebook computers, tablets, navigation systems, televisions, consumer appliances, and the like, may include a display device to display images. For example, a thin, light flat display panel may be used as the display panel and may include, for instance, a liquid crystal display panel, an organic light emitting display panel, a plasma display panel, a field emission display panel, an electrophoretic display panel, electrowetting display panel, etc. It is noted that the display panel may be a flexible display device, which may be thin, light, and infrangible. To this end, it is also noted that flexible display devices are permeating into fields involving information technology products, media made of clothes or paper, and the like.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a flexible display device and a method of displaying images using the same.

Additional aspects will be set forth in the detailed description which follows, and, in part, will be apparent from the disclosure, or may be learned by practice of the inventive concept.

According to exemplary embodiments, a flexible display device includes a flexible display panel, a first sensor, a second sensor, and at least one control unit. The flexible display panel is bendable about an axis that divides the flexible display panel into a first portion and a second portion. The first sensor is configured to sense first spatial information of the first portion. The second sensor is configured to sense second spatial information of the second portion. The at least one control unit is configured to: determine bending information of the flexible display unit based on the first spatial information and the second spatial information; select an application according to the bending information; process image information through the application to generate image data; and drive the flexible display panel with the image data.

According to exemplary embodiments, a method includes: sensing first spatial information of a first portion of a flexible display device bent about an axis; sensing second spatial information of a second portion of the flexible display device; determining bending information of the flexible display device based on the first spatial information and the second spatial information; selecting an application based on the bending information; processing image information via the application to generate image data; and driving the flexible display unit to display an image using image data.

According to exemplary embodiments, a flexible display device may sense spatial information of various portions of a flexible display panel via one or more sensors and may determine bending information based on the spatial information. In this manner, the flexible display device may generate image data based on the bending information. As such, a user may freely transform (or otherwise manipulate) the shape of the flexible display device to, for instance, interact with the flexible display device, e.g., input a signal to the flexible display device. This enables the flexible display device to provide a new, unique method to interact therewith, as well as improves the usability of the flexible display device.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 9B is a perspective view of the flexible display unit of FIG. 9A in a bent (or otherwise flexed) state, according to exemplary embodiments.

DETAILED DESCRIPTION OF THE ILLUSTRATED EMBODIMENTS

Figure 1:
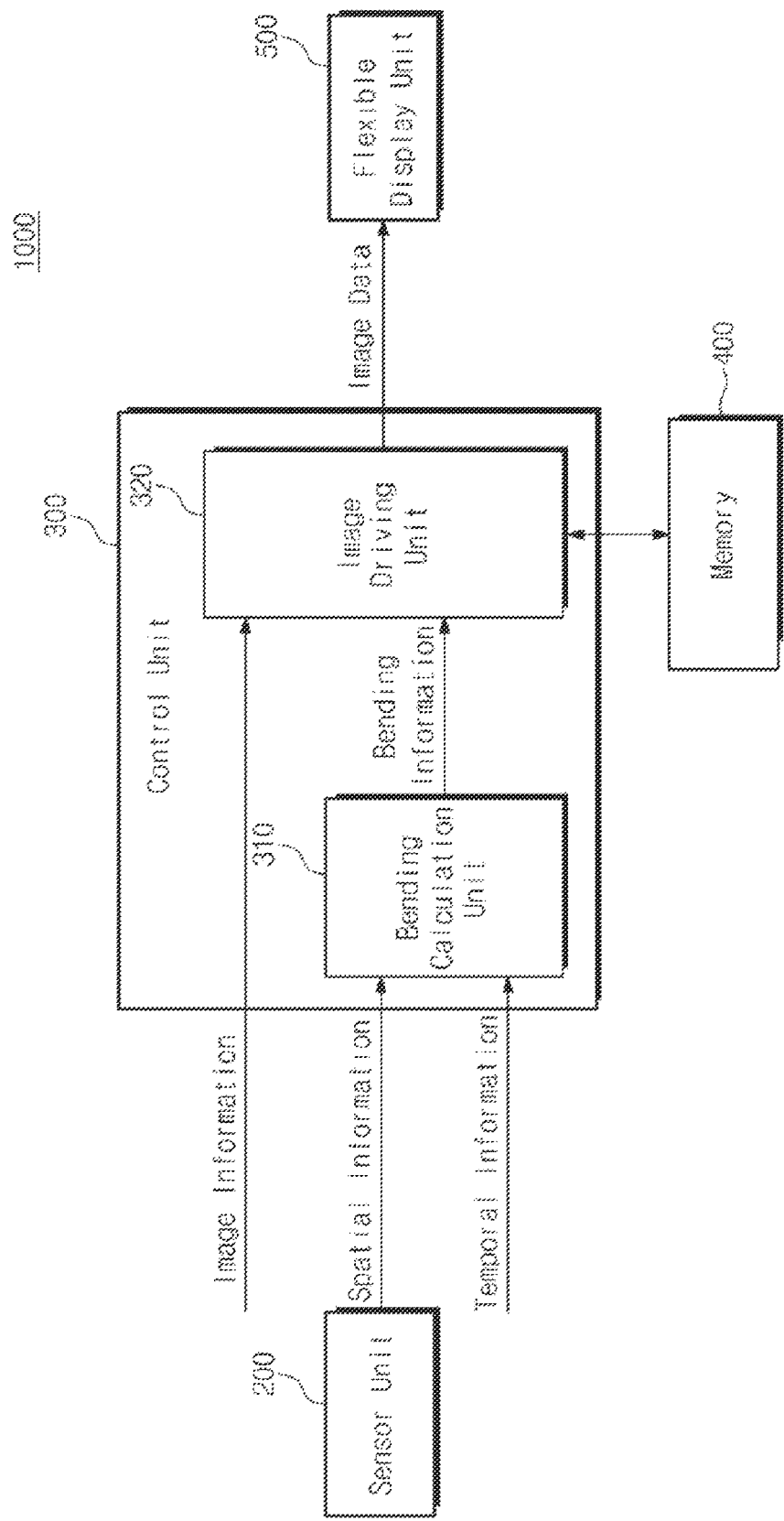
FIG. 1 is a block diagram schematically illustrating a flexible display device, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a block diagram schematically illustrating a flexible display device, according to exemplary embodiments.

Referring to FIG. 1, a flexible display device 1000 may include a sensor unit 200, a control unit 300, a memory 400, and a flexible display unit 500. Although specific reference will be made to this particular implementation, it is also contemplated that flexible display device 1000 may embody many forms and include multiple and/or alternative components. For example, it is contemplated that the components of the flexible display device 1000 may be combined, located in separate structures, and/or separate locations.

According to exemplary embodiments, the flexible display unit 500 may display an image as temporal information (e.g., a texture, video, picture, two-dimensional image, three-dimensional image, etc.). The flexible display unit 500 may be bent by an external force, e.g., by a user of the flexible display device 1000. When bent, the flexible display unit 500 may be divided into a plurality of portions. If the flexible display unit 500 is bent, at least one of the portions may be shifted from an original position to another position according to the bending force. It is noted that each of the portions of the flexible display unit 500 may be defined as at least one or more of components of the flexible display unit 500. Also, an area that each portion of the flexible display unit 500 defines and its position may be changed and likewise defined. It is noted, however, that the portions of the flexible display unit 500 do not overlap one another, and, thereby, are located in different positions.

The sensor unit 200 may be disposed to respectively correspond to the portions of the flexible display unit 500 and may sense spatial information of the portions. The spatial information may include spatial information of each of the portions of the flexible display unit 500 corresponding to the sensor unit 200. The spatial information may include a coordinate of a specific point in space, a velocity being a differential value in time of the coordinate, an acceleration being a differential value in time of the velocity, and the like. Also, the spatial information may further comprise an angle of the specific point, an angular velocity being a differential value in time of the angle, an angular acceleration being a differential value in time of the angular velocity, and the like. Further, the spatial information may include spatial information sensed at a specific point in time and a plurality of spatial information sensed at various points in time.

The control unit 300 may include a bending calculation unit 310 and an image driving unit 320. The control unit 300 may perform an overall function to drive the flexible display device 1000. The control unit 300 may include an operating system, a microprocessor to drive the operating system, and one or more applications executed on (or in accordance with) the operating system.

The bending calculation unit 310 may calculate (or otherwise determine) bending information based on the spatial information and temporal information. The temporal information may include information about a time when the spatial information is sensed. In exemplary embodiments, the bending calculation unit 310 may calculate a difference between spatial information based on a comparison of the spatial information. The difference between the spatial information may be at least one of a coordinate difference, an angle difference, an angular velocity difference, an acceleration difference, an angular acceleration difference, etc., between portions of the flexible display unit 500. To this end, the bending calculation unit 310 may be configured to determine bending information. The bending information may include information associated with the bending (or otherwise flexing) of the flexible display unit 500. The bending information may include various different types of information corresponding to the bending of the flexible display unit 500. For example, the bending information may include at least one of a level of bending of the flexible display unit 500, a bending velocity, a bending acceleration, etc.

The image driving unit 320 may form image data based on the bending information and image information. The image information may include information about an image displayed via the flexible display unit 500 and may be provided from an image source, such as an external image source. The external image source, for example, may be a television receiver, a video player, a computer, etc. It is also noted that the image driving unit 320 may determine a bending of the flexible display unit 500 based on the bending information and may perform a determined operation according to the bending. The determined operation, for example, may be an operation in which an application is selected and executed. It is also contemplated that the determined operation may, for example, correspond to an interaction (or other input command) to an application or process. In exemplary embodiments, the image driving unit 320 may select an application of a plurality of applications to be selected and executed according to the bending information. To this end, the image driving unit 320 may process the image information through the selected application to generate the image data. In exemplary embodiments, the control unit 300 may drive the flexible display unit 500 using (or based on) the image data.

The memory 400 may store the operating system and the plurality of applications. The control unit 300 may read the operating system and the plurality of applications from the memory 400 and may execute them. The control unit 300 may store data for driving the flexible display device 1000 in the memory 400.

In exemplary embodiments, the sensor unit 200, the control unit 300, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the sensor unit 200, the control unit 300, and/or one or more components thereof may include or otherwise be associated with one or more memories (e.g., memory 400) including code (e.g., instructions) configured to cause the sensor unit 200, the control unit 300, and/or one or more components thereof to perform one or more of the features, functions, processes, etc., described herein.

The memory 400 may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

According to exemplary embodiments, the flexible display device 1000 may provide a new, unique input manner to a user of the flexible display device 1000 through the sensor unit 200, the bending calculation unit 310, and the image driving unit 320. This may, in turn, increase (or otherwise improve) the usability of the flexible display device 1000. For example, the sensor unit 200 sensing spatial information of the portions of the flexible display unit 500 may enable the sensor unit 200 to sense various input signals a user. As such, the user may enter (or otherwise input) an intended input signal to the flexible display device 1000 in an instinctive and free manner. In other words, the user may operate (or otherwise manipulate) the flexible display device 1000 itself to input commands to the flexible display device 1000 or may control an image displayed via the flexible display device 1000 via such manipulations.

Figure 2:
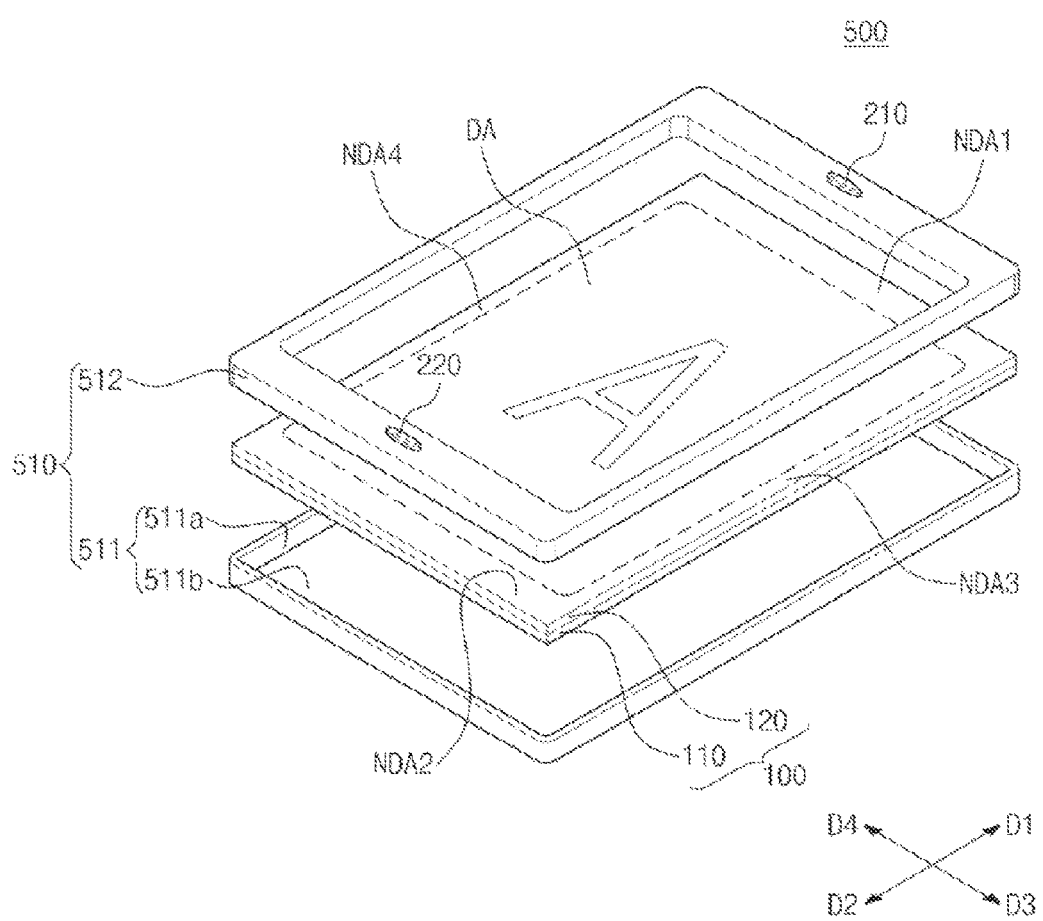
FIG. 2 is an exploded perspective view of a flexible display unit of the flexible display device of FIG. 1, according to exemplary embodiments.

FIG. 2 is an exploded perspective view of a flexible display unit of the flexible display device of FIG. 1, according to exemplary embodiments.

Referring to FIG. 2, a flexible display unit 500 may include a flexible display panel 100 and a cover member 510. The flexible display panel 100 is not limited to any specific type. For example, flexible display panel 100 may be a liquid crystal display panel, an organic light emitting display panel, a plasma display panel, a field emission display panel, an electrophoretic display panel, an electrowetting display panel, etc.

According to exemplary embodiments, the flexible display panel 100 may be formed as any suitable shape. For instance, the flexible display panel 100 may have a squared (or rectangular) plate structure with two pairs of edges. The edges of each pair may be opposite to each other and may be parallel with each other. In this manner, the flexible display panel 100 may be formed to have a short edge and a long edge, which may be longer than the short edge, that form a rectangular shape. The long edge may extend in a first direction D1 and a direction opposite the first direction D1 may be referred to as a second direction D2. The short edge may extend in a third direction D3 and a direction opposite the third direction D3 may be referred to as a fourth direction D4.

As seen in FIG. 2, the flexible display panel 100 may include a display area DA and a non-display area disposed outside the display area DA, e.g., surrounding the display area DA. In this manner, the flexible display panel 100 may receive image data and may display an image in the display area DA based on the image data. The non-display area may not display an image and may include first to fourth non-display areas NDA1 to NDA4. The first non-display area NDA1 may be defined at a first side of the display area DA in the first direction D1 and may extend in the third direction D3. The second non-display area NDA2 may be defined at a second side of the display area DA in the second direction D2 and may extend in the third direction D3. The third non-display area NDA3 may be defined at a third side of the display area DA in the third direction D3 and may extend in the first direction D1. The fourth non-display area NDA4 may be defined at a fourth side of the display area DA in the fourth direction D4 and may extend in the fourth direction D4.

A plurality of signal lines may be disposed in one or more of the non-display areas NDA1 to NDA4. The plurality of signal lines, for example, may be formed of any suitable conductive material, such as, for example, any suitable metal material.

According to exemplary embodiments, the flexible display panel 100 may include a bottom plate 110 and a top plate 120 opposite the bottom plate 110. A light control layer (not shown) may be provided between the bottom plate 110 and the top plate 120. The bottom plate 110 and the top plate 120 may include at least one electrode (not illustrate) to apply an electric field to the light control layer and to control an image by adjusting the electric field. The light control layer may be one of an organic light emitting layer, a liquid crystal layer, a plasma formation layer, a field emission layer, an electrophoretic layer, an electrowetting layer, etc.

The cover member 510 may be formed to surround the flexible display panel 100 and may protect the flexible display panel 100 from external impacts and/or contaminants. The cover 510 may include a bottom cover 511 and a top cover 512. The shape(s) of the bottom and top covers 511 and 512 may correspond to the shape of the flexible display panel 100; however, it is contemplated that any other suitable shape may be utilized. Each of the bottom and top covers 511 and 512 may have the same rectangular shape as the flexible display panel 100. In a plan view, an area of the bottom cover 511 may be larger than that of the flexible display panel 100. That is, the flexible display panel 100 may "fit within" the bottom cover 511. To this end, in a plan view, an area of the top cover 512 may be larger than that of the bottom cover 511. For instance, the bottom cover 511 may "fit within" the top cover 512.

According to exemplary embodiments, the bottom cover 511 may include a first surface (e.g., an undersurface) 511b and a plurality of second surfaces (e.g., lateral surfaces) 511a. The plurality of lateral surfaces 511a may vertically extend from the undersurface 511b to form, for example, a cavity region (or receipt space) in the bottom cover 511. In this manner, the flexible display panel 100 may be received in the receipt space. The top cover 512 may be combined with the bottom cover 511 with the flexible display panel 100 disposed between the bottom cover 511 and the top cover 512.

The top cover 512 may include a center portion and a peripheral portion surrounding the center portion. An image displayed in the display area DA may be displayed through the center portion. That is, the center portion may be an opening corresponding to the display area DA. It is also contemplated that the center portion of the top cover 512 may be formed of any suitable material, such as, for example, glass, transparent plastic, etc. The peripheral portion may include first to fourth peripheral portions formed in correspondence with the first to fourth non-display areas NDA1 to NDA4. For example, the first peripheral portion may be formed in correspondence with the first non-display area NDA1, the second peripheral portion may be formed in correspondence with the second non-display area NDA2, the third peripheral portion may be formed in correspondence with the third non-display area NDA3, and the fourth peripheral portion may be formed in correspondence with the fourth non-display area NDA4. In other words, the first to fourth peripheral areas may, for instance, respective cover the first to fourth non-display areas NDA1 to NDA4 of the flexible display panel 100.

The sensor unit 200 may include a first sensor unit 210 and a second sensor unit 220. The first sensor unit 210 may be disposed in the first peripheral portion and the second sensor unit 220 may be disposed in the second peripheral portion. It is contemplated, however, that any suitable number of sensor units may be utilized in association with exemplary embodiments described herein. To this end, the various sensor units may be disposed in any suitable location of the flexible display unit 500. As such, the arrangement of the first and second sensor units 210 and 220 may be changed in any suitable manner. For example, the first and second sensor units 210 and 220 may be disposed at the bottom cover 511, at either one of the bottom plate 110 and the top plate 120, etc.

According to exemplary embodiments, the sensor unit 200 may include various sensors for sensing spatial information. For instance, the first and second sensor units 210 and 220 may include at least one of a translational motion sensor and a rotary motion sensor.

A translational motion sensor may sense a translational motion of an object. For example, the translational motion sensor may sense a translational motion of an object in a three-dimensional space defined by an x-axis, a y-axis perpendicular to the x-axis, and a z-axis perpendicular to the x-axis and the y-axis. That is, the translational motion sensor may sense Cartesian coordinates (e.g., an x-coordinate, a y-coordinate, and a z-coordinate) of an object in time to sense displacement of the object along the x-axis, the y-axis, and/or the z-axis. It is also contemplated that the translational motion sensor may sense a velocity and/or an acceleration of the object along the x-axis, a velocity and/or an acceleration of the object moving along the y-axis, and/or a velocity and/or an acceleration of the object moving along the z-axis. In this manner, the translational motion sensor may be, for instance, a gravitational acceleration sensor, however, any other suitable sensor may be utilized in association with exemplary embodiments described herein.

The rotary motion sensor may sense a rotary motion of an object. It is noted that a rotational angle about the x-axis may be defined as a pitch, a rotational angle about the y-axis may be defined as a roll, and a rotational angle about the z-axis may be defined as a yaw. In this manner, the rotary motion sensor may sense the pitch, roll, and yaw of an object when the object rotates in the aforementioned three-dimensional space. It is also contemplated that the rotary motion sensor may sense a rotating velocity and/or a rotating acceleration of the pitch, roll, and/or yaw. As such, the rotary motion sensor may be a gyro sensor, for example, however, any other suitable sensor may be utilized in association with exemplary embodiments described herein.

According to exemplary embodiments, each of the first and second sensor units 210 and 220 may include a translational motion sensor. For example, the first sensor unit 210 may include a first translational motion sensor, and the second sensor unit 220 may include a second translational motion sensor. It is contemplated, however, that any suitable combination of sensor units may be utilized in association with exemplary embodiments described herein. For instance, the number of sensors included in the sensor unit 200 may be variously changed, e.g., the first sensor unit 210 may be provided in plurality in the first periphery portion, and the second sensor unit 220 may be provided in plurality in the second periphery portion. As another example, each of the first and second sensor units 210 and 220 may include a translational motion sensor and a rotary motion sensor. Again, any suitable disposition, number, and/or type of sensors may be utilized in association with exemplary embodiments described herein.

Figure 3:
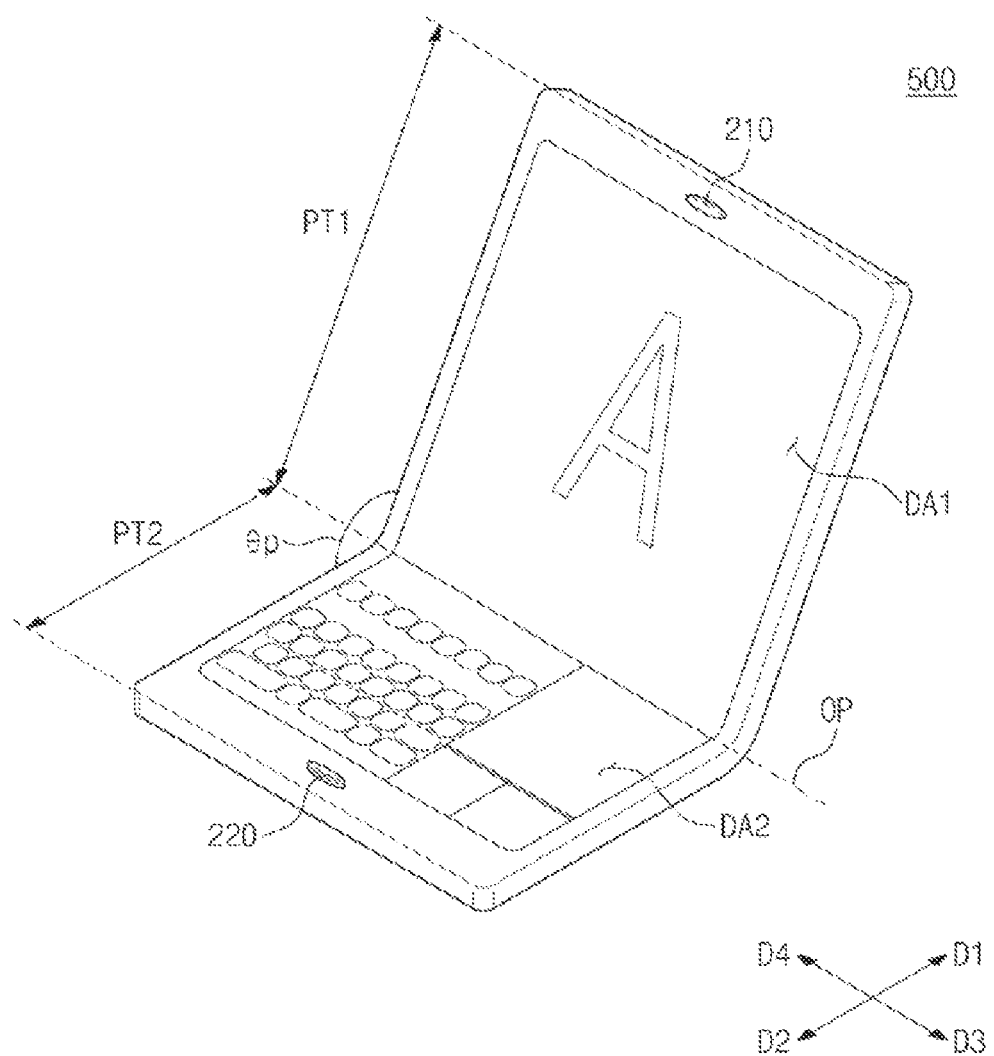
FIG. 3 is a perspective view of the flexible display unit of FIG. 2 in a bent (or otherwise flexed) state, according to exemplary embodiments.

FIG. 3 is a perspective view of the flexible display unit of FIG. 2 in a bent (or otherwise flexed) state, according to exemplary embodiments.

Referring to FIGS. 2 and 3, a flexible display unit 500 may be bent about an imaginary line OP extending parallel to the third direction D3. It is noted that the imaginary line OP may be an arbitrary axis through the flexible display unit 500. The term "bending" may be used to indicate that a shape is not fixed, but changed from an original shape to a different shape. For example, the term "bending" may be interpreted to include a meaning that a shape is bent or folded along one or more imaginary lines or areas and that a shape curves or is rolled. To this end, it is noted that all or one or more parts of the flexible display panel 100 may have flexibility. In exemplary embodiments, components of the flexible display panel 100 may be formed of any suitable material (e.g., plastic, etc.) having flexibility. As such, a shape of the flexible display panel 100 may be bent by an external force, such as, for example, a user of the flexible display panel 100.

According to exemplary embodiments, cover member 510 may be all or partially flexible. As such, components of the cover member 510 may be formed of any suitable material (e.g., plastic, etc.) having flexibility. Likewise, a shape of the cover member 510 may be bent by an external force.

In exemplary embodiments, the flexible display panel 100 may be divided into a plurality of portions, which may include a first portion PT1 and a second portion PT2, as illustrated in FIG. 3. It is noted that the logical divisions of the flexible display panel 100 may change depending on the number and disposition of bends. When, for example, the flexible display unit 500 is bent along the imaginary line OP, one or more of the first and second portions PT1 and PT2 may move from an original position to a different position, respectively.

Shapes of the first and second portions PT1 and PT2 may be various. In exemplary embodiments, the first and second portions PT1 and PT2 may be sequentially arranged in the second direction D2 or the first direction D1 with the imaginary line OP disposed between the first and second portions PT1 and PT2. It is also contemplated that the imaginary line OP may bisect the flexible display unit 500 with respect to the first or second direction D1 or D2. As such, the first and second portions PT1 and PT2 may exhibit the same (or substantially the same) shape. For instance, each of the first and second portions PT1 and PT2 may have a rectangular shape having edges parallel to the long edges and the short edges of the flexible display device 1000. It is contemplated that an area of the first portion PT1 may be larger than that the area of the second portion PT2, or vice versa.

As seen in FIG. 3, the first portion PT1 may be partially overlapped by the first peripheral portion, as well as partially overlapped by respective portions of the third and fourth peripheral portions of the top cover 512. The second portion PT2 may be partially overlapped by the second peripheral portion, as well as partially overlapped by respective portions of the third and fourth peripheral portions of the top cover 512.

The flexible display unit 500 may be bent by various angles. It is noted that a bending angle θp may be defined as an angle between an upper surface of the first portion PT1 and an upper surface of the second portion PT2. In exemplary embodiments, the bending angle θp may be substantially an obtuse angle, however, any suitable angle may be utilized in association with exemplary embodiments described herein. For example, the bending angle θp may be variable according to an external force applied by a user. The bending angle θp may be substantially acute, for example. In this manner, the flexible display unit 500 may be bent in such a manner that the first and second portions PT1 and PT2 overlap one another.

In exemplary embodiments, spatial information may include first spatial information and second spatial information. A first sensor unit 210 may sense the first spatial information, and the second sensor unit 220 may sense the second spatial information. The first spatial information may be associated with the first portion PT1. The first spatial information may include a set of spatial information of all or one or more points of an area defined as the first portion PT1 and spatial information of a point corresponding to the first portion PT1. In exemplary embodiments, the first spatial information may include spatial information of a point where the first sensor unit 210 is disposed.

For example, the first spatial information may include one of, but not limited to, a coordinate, angle, velocity, acceleration, angular velocity, angular acceleration, etc., of the first portion PT1, a combination of two or more thereof, or all thereof. However, exemplary embodiments are not limited thereto. Also, the first spatial information may include one or more values sensed at various points in time. For example, a point in time before the flexible display unit 500 is bent may be referred to as a first point in time and a point in time when the flexible display unit 500 is bent may be referred to as a second point in time. In this manner, the first spatial information may include spatial information of the first portion PT1 at the first point in time and spatial information of the first portion PT1 at the second point in time.

The second spatial information may be associated with the second portion PT2. The second spatial information may include a set of spatial information of all or one or more points of an area defined as the second portion PT2 and spatial information of a point corresponding to the second portion PT2. In exemplary embodiments, the second spatial information may include spatial information of a point where the second sensor unit 220 is disposed.

For example, the second spatial information may include one of, but not limited to, a coordinate, angle, velocity, acceleration, angular velocity, angular acceleration, etc., of the second portion PT2, a combination of two or more thereof, or all thereof. However, exemplary embodiments are not limited thereto. Also, the second spatial information may be values sensed at various points in time. For example, the second spatial information may include spatial information of the second portion PT2 at the first point in time and spatial information of the second portion PT2 at the second point in time.

Figure 4A:
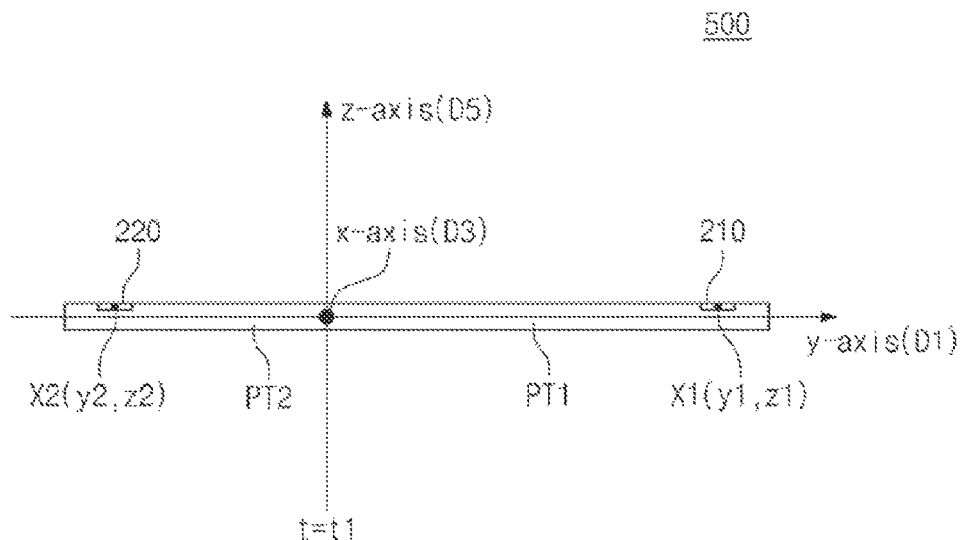
FIG. 4A is a lateral view of a flexible display unit, according to exemplary embodiments.
Figure 4B:
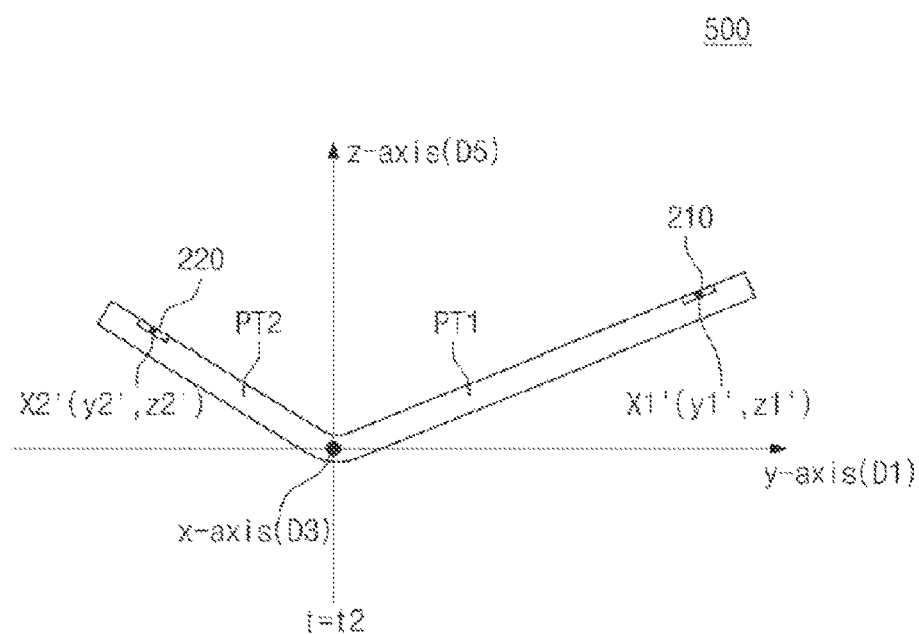
FIG. 4B is a lateral view of a flexible display unit in a bent (or otherwise flexed) state, according to exemplary embodiments.

FIG. 4A is a lateral view of a flexible display unit, according to exemplary embodiments. FIG. 4B is a lateral view of a flexible display unit in a bent (or otherwise flexed) state, according to exemplary embodiments.

Referring to FIG. 4A, a flexible display unit 500 may be in a state where it is not bent at a first point in time t1. Referring to FIG. 4B, the flexible display unit 500 may be in a state where it is bent at a second point in time t2. Referring to FIGS. 4A and 4B, a y-axis may be defined in the first direction D1, an x-axis may be defined in the third direction D3, and a fifth direction D5 may be defined as perpendicular to the first and third directions D1 and D3. A z-axis may be defined in the fifth direction D5. As seen in FIGS. 4A and 4B, the third direction D3 and a direction of the x-axis may extend out of the page.

First spatial information may include a first start coordinate X1 and a first end coordinate X1'. The first start coordinate X1 may be a coordinate of the first sensor unit 210 at a first point in time t1, and its value may be (y1, z1). The first end coordinate X1' may be a coordinate of the first sensor unit 210 at a second point in time t2, and its value may be (y1', z1'). Second spatial information may include a second start coordinate X2 and a second end coordinate X2'. The second start coordinate X2 may be a coordinate of the second sensor unit 220 at the first point in time t1, and its value may be (y2, z2). The second end coordinate X2' may be a coordinate of the second sensor unit 220 at the second point in time t2, and its value may be (y2', z2').

At the first point in time t1, z1 may be equal to z2 since the flexible display unit 500 may be in a state where it is not bent. At the first point in time t1, a first translational motion sensor may sense the first start coordinate X1; that is, (y1, z1). At the second point in time t2, a second translational motion sensor may sense the second start coordinate X2; that is, (y2, z2). At the second point in time t2, the first translational motion sensor may sense the first end coordinate X1'; that is, (y1', z1'). At the second point in time t2, the second translational motion sensor may sense the second end coordinate X2'; that is, (y2', z2').

Figure 5:
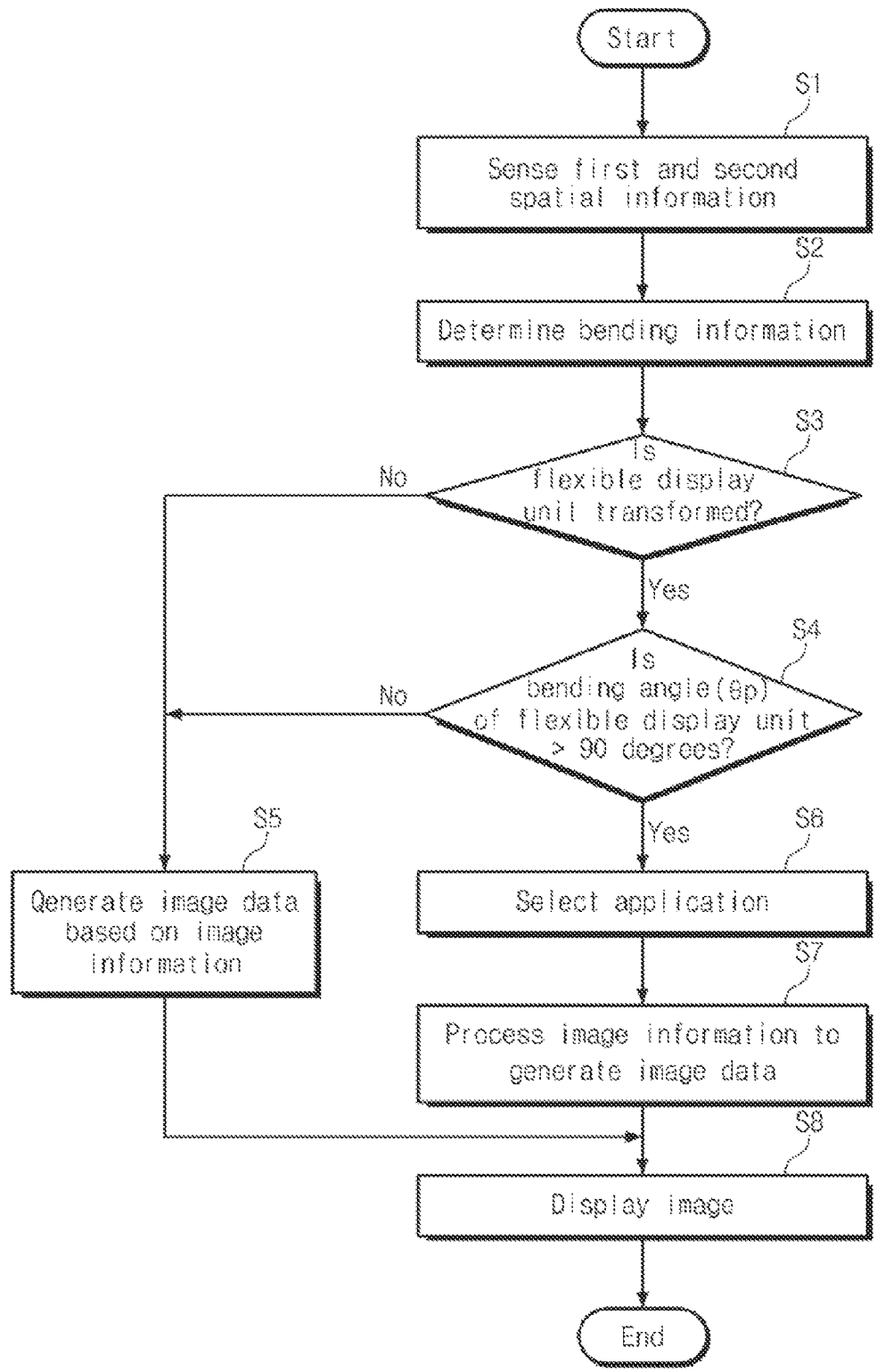
FIG. 5 is a flowchart of a process to display an image via a flexible display device, according to exemplary embodiments.
Figure 6:
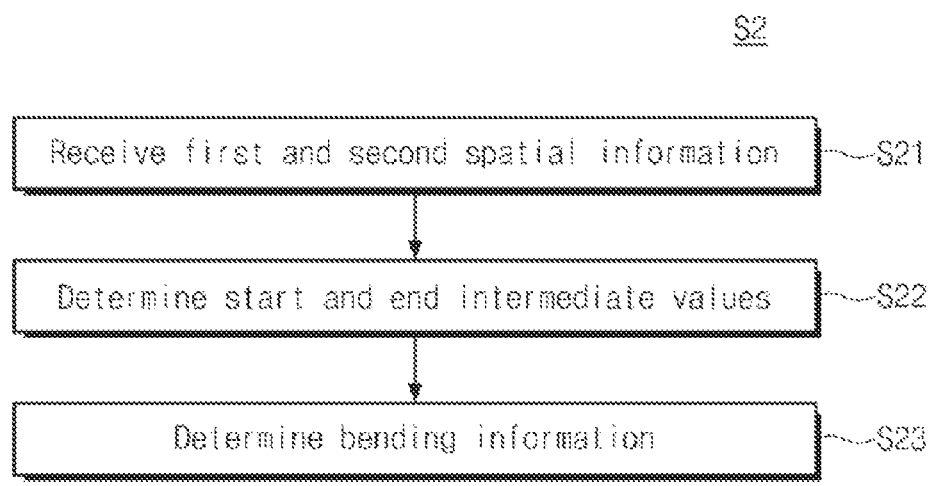
FIG. 6 is a flowchart of a process to determine bending information in association with the process of FIG. 5, according to exemplary embodiments.

FIG. 5 is a flowchart of a process to display an image via a flexible display device, according to exemplary embodiments. FIG. 6 is a flowchart of a process to determine bending information in association with the process of FIG. 5, according to exemplary embodiments. Accordingly, an operation of the flexible display device 1000 will be more fully described with reference to FIGS. 1 to 6.

As previously described, the first sensor unit 210 may sense a first start coordinate X1 and a first end coordinate X1' as first spatial information (S1). The second sensor unit 220 may sense a second start coordinate X2 and a second end coordinate X2' as second spatial information (S1). The first and second spatial information may be stored to, for example, memory 400. To this end, temporal information, which may be associated with spatial information, may also be stored in memory 400. The bending calculation unit 310 may calculate (or otherwise determine) bending information based on the first and second spatial information of the first and second sensor units 210 and 220 and the temporal information (S2). The temporal information may include information about a first point in time t1 when the first and second start coordinates X1 and X2 are sensed and information about a second point in time t2 when the first and second end coordinates X1' and X2' are sensed.

In exemplary embodiments, the bending calculation unit 310 may receive the first spatial information from the first sensor unit 210 and the second spatial information from the second sensor unit 220 (S21). The bending calculation unit 310 may calculate (or otherwise determine) an intermediate value based on the first and second spatial information. The intermediate value may include a start intermediate value an end intermediate value (S22). For example, the bending calculation unit 310 may calculate a difference between the first start coordinate X1 included in the first spatial information and the second start coordinate X2 included in the second spatial information as the start intermediate value. To this end, the bending calculation unit 310 may calculate a difference between the first end coordinate X1' included in the first spatial information and the second end coordinate X2' included in the second spatial information as the end intermediate value. As such, the bending calculation unit 310 may calculate (or otherwise determine) the bending information based on the temporal information and the start and end intermediate values (S23).

According to exemplary embodiments, the bending calculation unit 310 may calculate a bending level (e.g., the amount of bending that has occurred), a bending velocity, and a bending acceleration, etc., of the flexible display unit 500 (or at least one portion of the flexible display unit 500) using the temporal information and the start and end intermediate values. For example, the bending calculation unit 310 may calculate the bending level of the flexible display unit 500 based on a difference between the start intermediate value and the end intermediate value. The bending level, for example, may be a bending angle θp of the flexible display unit 500. In this manner, the memory 400 may store angle calculation information for calculating the bending angle θp through the start intermediate value and the end intermediate value, and the bending calculation unit 310 may calculate the bending angle θp based on the angle calculation information.

The bending calculation unit 310 may calculate the bending velocity of the flexible display unit 500 using a difference between the start intermediate value and the end intermediate value. For example, the bending calculation unit 310 may calculate the bending velocity of the flexible display unit 500 by dividing the difference between the start intermediate value and the end intermediate value by a difference between the second point in time t2 and the first point in time t1. That is, the bending velocity of the flexible display unit 500 may be determined using the following Equation (1).

$$Vp = \frac{MV' - MV}{t2 - t1} \qquad \text{Eq. (1)}$$

In Equation (1), "Vp" may indicate the bending velocity, "MV" may indicate the start intermediate value, and "MV'" may indicate the end intermediate value. Further, "t2" may indicate the second point in time, and "t1" may indicate the first point in time. It is noted, however, that the bending velocity of the flexible display unit 500 may be calculated in any other suitable manner. For example, the memory 400 may store velocity calculation information for calculating the bending velocity based on the temporal information, the start intermediate value, and the end intermediate value and the bending calculation unit 310 may calculate the bending velocity using the velocity calculation information.

According to exemplary embodiments, the bending acceleration of the flexible display unit 500 may be calculated using the bending velocity of the flexible display unit 500. For example, the bending acceleration of the flexible display unit 500 may be calculated by dividing the bending velocity of the flexible display unit 500 by a difference between the second point in time t2 and the first point in time t1. That is, the bending acceleration of the flexible display unit 500 may be determined using the following Equation (2).

$$ap = \frac{Vp}{t2 - t1} \quad \text{Eq. (2)}$$

In the Equation (2), "ap" may indicate the bending acceleration, and "Vp" may indicate the bending velocity. Further, "t2" may indicate the second point in time, and "t1" may indicate the first point in time. It is noted, however, that the bending acceleration of the flexible display unit 500 may be calculated in any other suitable manner. For example, the memory 400 may store acceleration calculation information for calculating the bending acceleration using the temporal information, the start intermediate value, and the end intermediate value, and the bending calculation unit 310 may calculate the bending acceleration using the acceleration calculation information.

According to exemplary embodiments, the bending information may be calculated based on coordinate values of the first and second sensor units 210 and 220 included in the first and second spatial information. It is contemplated, however, that any other suitable method may be utilized in association with exemplary embodiments described herein. To this end, the control unit 300 may calculate bending information using a variety of spatial information. For example, in the event that the first and second spatial information include different spatial information of the first and second sensor units 210 and 220, the bending calculation unit 310 may calculate the bending information based on the different spatial information.

For instance, the first and second spatial information may include angular velocities of the first and second sensor units 210 and 220. As such, the memory 400 may store calculation information for calculating the bending information using the sensed angular velocities, and the bending calculation unit 310 may calculate the bending information based on the calculation information.

An image driving unit 320 may determine whether the flexible display unit 500 is transformed (S3). For instance, the image driving unit 320 may determine whether the flexible display unit 500 has been bent (or otherwise flexed) from a first configuration position into a second configurable position. In exemplary embodiments, in the event that the flexible display unit 500 is not bent or its bending angle θp is below 90 degrees, the image driving unit 320 may generate image data by transforming image information to be suitable for an operational mode of the flexible display unit 500 (S5).

In exemplary embodiments, the image driving unit 320 may determine whether the bending angle θp of the flexible display unit 500 is greater than 90 degrees (S4). If the bending angle θp is greater than 90 degrees, then the image driving unit 320 may select one of a plurality of applications (S6). The plurality of applications may respectively perform various functions and may generate image data by processing image information to be suitable for the respective functions (S7). To this end, the flexible display unit 500 may display an image based on image data associated with the application and function(s) (S8).

An exemplary operation of an application will be described in more detail with reference to FIG. 3.

As seen in FIG. 3, an application may be executed such that the display area DA of the flexible display unit 500 is bisected into a first area DA1 and a second area DA2 according to the bending information. The application may process image information to generate image data. This may enable the flexible display unit 500 to display different images via the first area DA1 and the second area DA2. In exemplary embodiments, the first and second areas DA1 and DA2 may be variously changed. The first and second areas DA1 and DA2 may correspond to first and second portions PT1 and PT2, respectively. For example, the display area DA may be divided into the first and second areas DA1 and DA2 on the basis of the imaginary line OP, such that the display area DA is bisected with respect to the first direction D1.

The application may generate first image data and second image data. The flexible display unit 500 may receive the first image data to display a first image via the first area DA1. The flexible display unit 500 may receive the second image data to display a second image via the second area DA2. In exemplary embodiments, the first image may be an image generated by shrinking an image to be displayed in an area of the first area DA1. The second image may be an interface (e.g., user interface) image. In this manner, the flexible display device 1000 may further comprise a sensing unit disposed in correspondence with the second area DA2. If a user provides an input through the interface image, the sensing unit may generate an input signal corresponding to the input. The image driving unit 320 may control the first image displayed based on the first image data according to the input signal.

According to exemplary embodiments, the interface image may be an image that displays a keyboard, a keypad, a touch pad, and a mouse, for example. It is contemplated, however, that any other suitable interface component may be utilized in association with exemplary embodiments described herein, such as a virtualized input wheel, joystick, etc. The sensing unit may, for example, be a touch panel included in the flexible display unit 500. It is contemplated, however, that the application may perform various functions and may include any suitable number and/or types of interfaces/components of an interface.

Figure 7A:
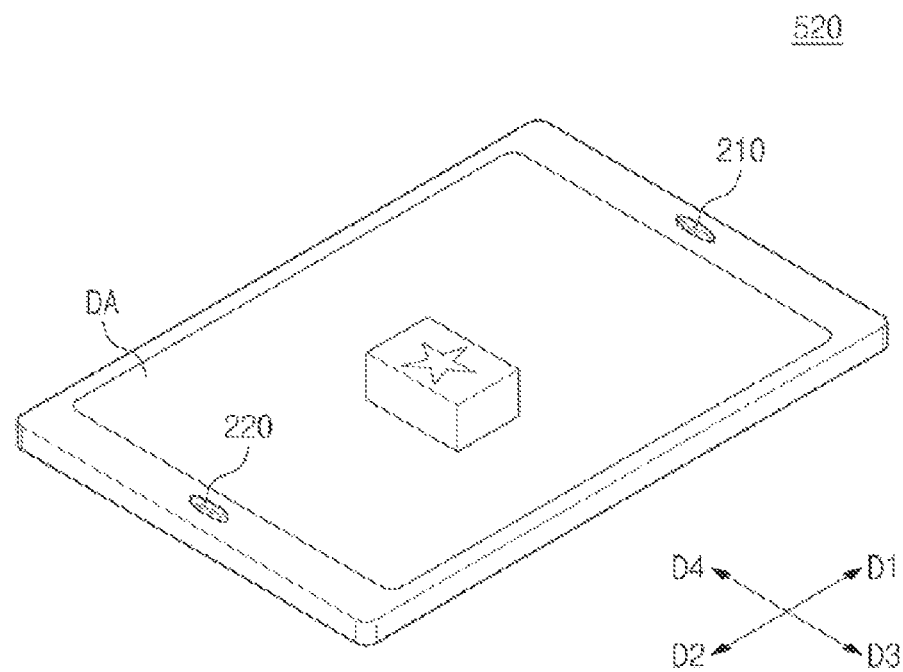
FIG. 7A is a perspective view of a flexible display unit, according to exemplary embodiments.
Figure 7B:
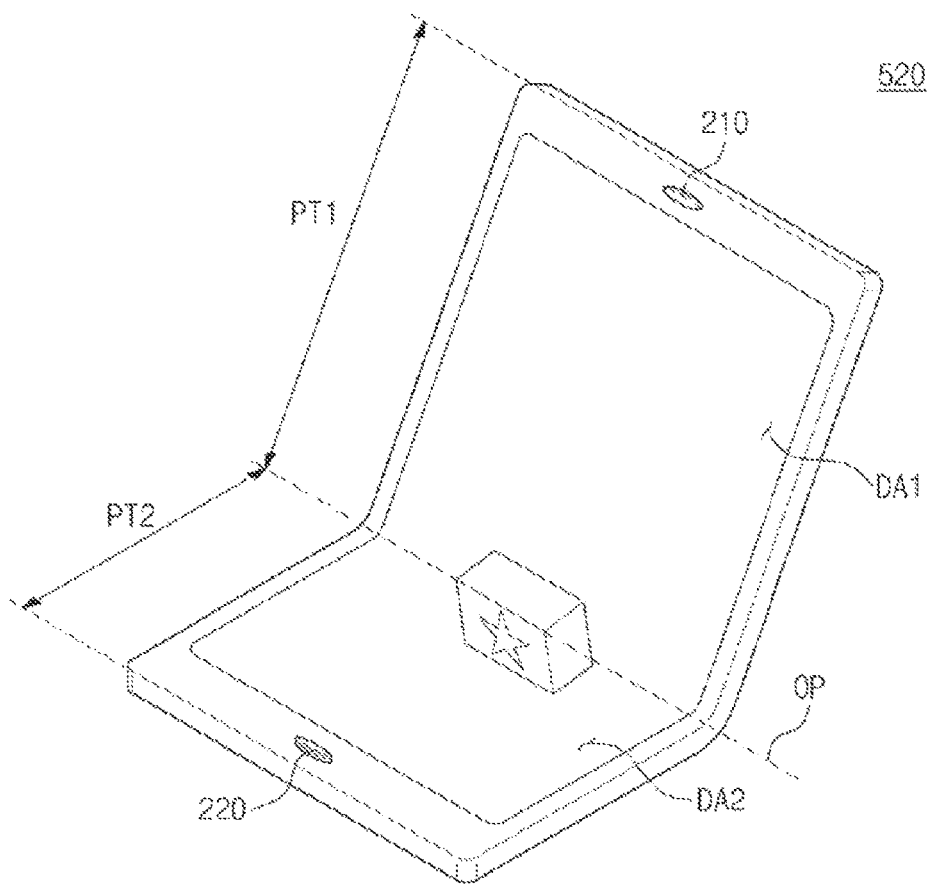
FIG. 7B is a perspective view of the flexible display unit of FIG. 7A in a bent (or otherwise flexed) state, according to exemplary embodiments.

Another application will be described with reference to FIGS. 7A and 7B. FIG. 7A is a perspective view of a flexible display unit, according to exemplary embodiments. FIG. 7B is a perspective view of the flexible display unit of FIG. 7A in a bent (or otherwise flexed) state, according to exemplary embodiments.

As seen in FIGS. 7A and 7B, a flexible display unit 520 has substantially the same function and structure as the flexible display unit 500 of FIGS. 1 to 4, except the application and first and second images displayed via the application are different in FIGS. 7A and 7B. As such, duplicative descriptions have been omitted to avoid obscuring exemplary embodiments described herein.

Referring to FIGS. 7A and 7B, the application may receive a bending angle θp of a flexible display unit 520 in real time and may process image information according to the bending angle θp. In FIG. 7A, the flexible display unit 520 may be in a state where it is not bent. In FIG. 7B, the flexible display unit 520 may be in a state where it is bent.

The flexible display unit 520 may display a hexahedral object via a display area DA based on image data.

In a state where the flexible display unit 520 is not bent, the hexahedral object may be displayed such that the front (marked by a star) of the hexahedral object is parallel with an upper surface of the display area DA, as seen in FIG. 7A. In a state where the flexible display unit 520 is bent, the hexahedral object may be rotated in accordance with the bending angle of the flexible display unit 520, such that a second surface of the hexahedral object is parallel with the upper surface of the second area DA2. It is also contemplated that the hexahedral object may be rotated such that the upper surface of the hexahedral object is parallel with the upper surface of the first area DA1. The image driving unit 320 may process image information such that the hexahedral object is rotated by the bending angle, and it may generate image data to effectuate the display of the rotated hexahedral object. In this manner, the flexible display unit 500 may enable a user to experience the display of the hexahedral object as though the user were directly manipulating the hexahedral object. It is contemplated, however, that the context displayed via the flexible display unit 520 may be any suitable context.

According to exemplary embodiments, the flexible display device 1000 may provide a new, unique input manner to the flexible display device 1000 via the sensor unit 200, the bending calculation unit 310, and the image driving unit 320. This may, in turn, improve (or otherwise increase) the usability of the flexible display device 1000. In other words, the user may provide an input to the flexible display device 1000 by instinctively bending the flexible display unit 500 or 520 in a manner that would create a corresponding change in the context being displayed via the flexible display device 1000. As such, the sensor unit 200 may sense spatial information having spatial information of each portion of the flexible display unit 500 or 520, such that the sensor unit 200 may sense transformation of the flexible display device 1000 in a three-dimensional space. Accordingly, the user may freely transform a shape of the flexible display unit 500 or 520 to enter an input signal to the flexible display device 1000.

Figure 8:
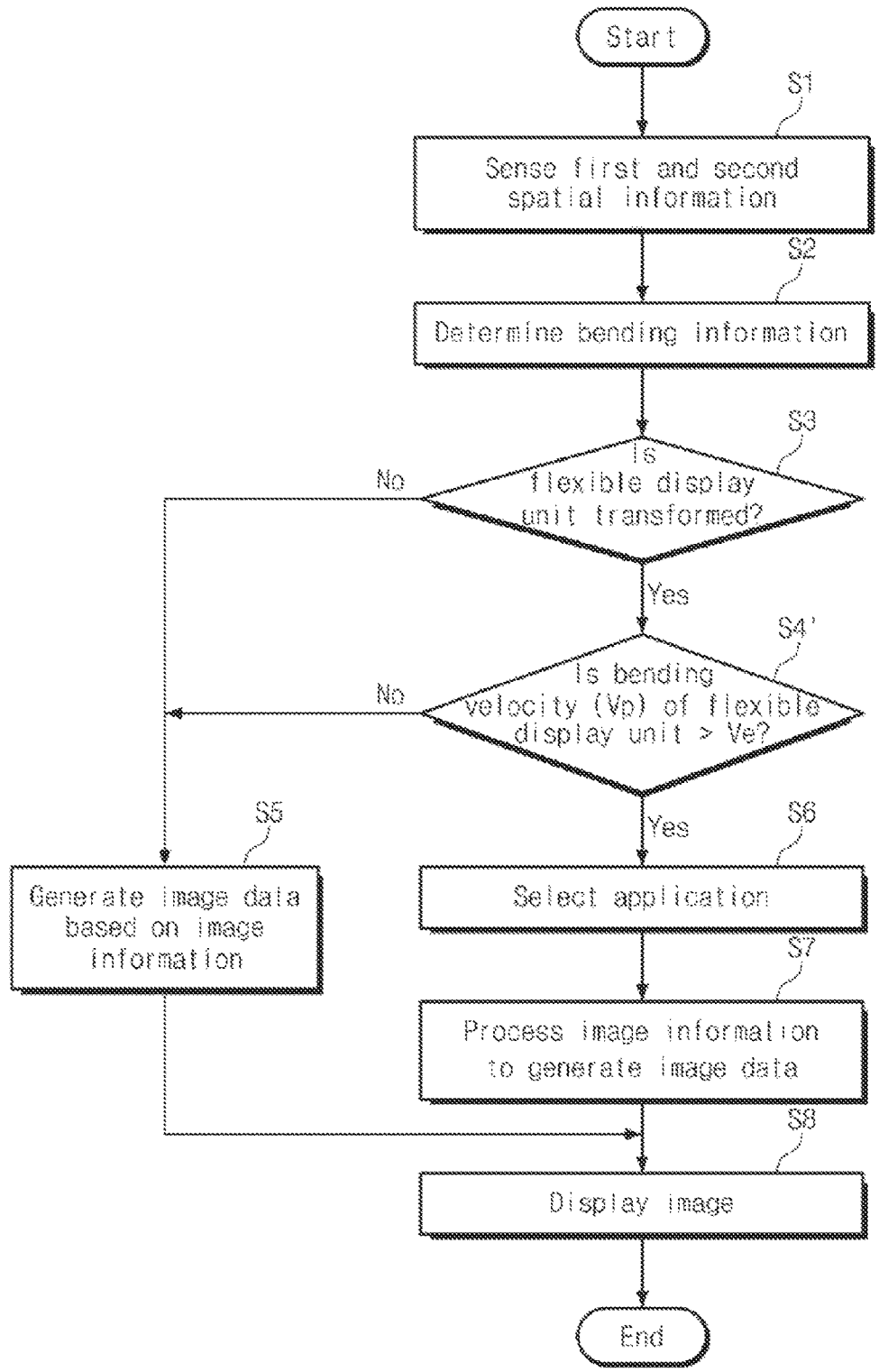
FIG. 8 is a flowchart of a process to display an image via a flexible display device, according to exemplary embodiments.
Figure 9A:
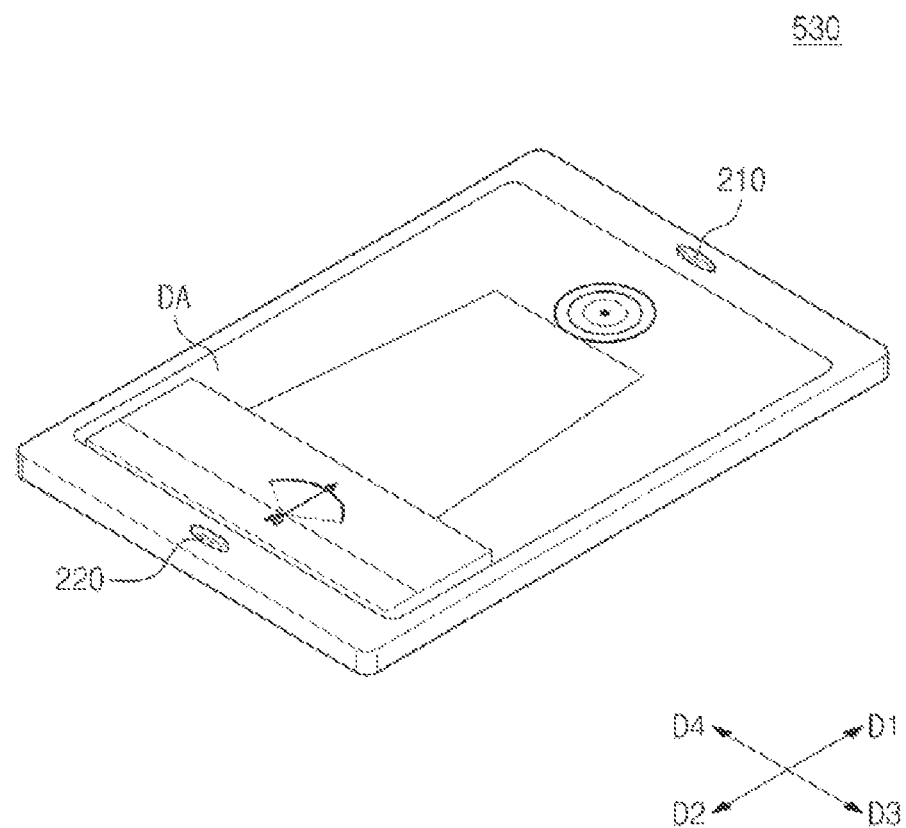
FIG. 9A is a perspective view of a flexible display unit, according to exemplary embodiments.

FIG. 8 is a flowchart of a process to display an image via a flexible display device, according to exemplary embodiments. FIG. 9A is a perspective view of a flexible display unit, according to exemplary embodiments. FIG. 9B is a perspective view of the flexible display unit of FIG. 9A in a bent (or otherwise flexed) state, according to exemplary embodiments. In FIGS. 8, 9A, and 9B, components that are substantially the same as those shown in FIGS. 1 to 4 may be marked by the same reference numerals. To this end, duplicative descriptions have been omitted to avoid obscuring exemplary embodiments described herein.

A flexible display unit 530 shown in FIGS. 9A and 9B may have similar functions and structure as the flexible display units shown in FIGS. 1 to 7B except the application and first and second images displayed via the application. As such, duplicative descriptions have been omitted to avoid obscuring exemplary embodiments described herein.

Referring to FIGS. 1, 8, 9A, and 9B, the image driving unit 320 may receive a bending velocity Vp of the flexible display unit 530 based on bending information determined in step S2, and may determine whether the bending velocity Vp is greater than a determined (or threshold) velocity Ve (S4'). In exemplary embodiments, the bending velocity Vp may refer to a relative velocity of the first sensor unit 210 with respect to the second sensor unit 220; that is, a relative velocity of the first sensor unit 210 moving toward the second sensor unit 220. If the bending velocity Vp of the flexible display unit 530 is greater than the threshold velocity Ve, the image driving unit 320 may select an application (or function) from a plurality of applications (or functions) (S6). When the flexible display unit 530 is not bent or when the bending velocity Vp of the flexible display unit 530 is less than or equal to the threshold velocity Ve, image data may be generated based on image information without using the application (S5).

According to exemplary embodiments, the application selected in step S6 may be a bow and arrow game. A user may transform the flexible display unit 530 to adjust a velocity of an arrow being shot at a target. The application may receive the bending velocity Vp of the flexible display unit 530, and it may process the bending velocity Vp to generate image data associated with the flight of the arrow. For instance, the flexible display unit 530 may display an arrow that flies at a velocity corresponding to the bending velocity Vp (or at least proportional to the bending velocity Vp) of the flexible display unit 530. In this manner, the flexible display unit 530 may provide a new, unique input manner, and, as such, it may enable a user to experience a game (or other type of application) as if the user directly operated (or otherwise manipulated) an object displayed via the flexible display panel. It is contemplated, however, that exemplary embodiments may be applied in association with any suitable application or function of an application.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A flexible display device, comprising:
   a flexible display panel bendable about an axis that divides the flexible display panel into a first portion and a second portion;
   a first sensor configured to sense first spatial information of the first portion;
   a second sensor configured to sense second spatial information of the second portion; and
   at least one control unit configured to:
   determine bending information of the flexible display panel based on the first spatial information and the second spatial information; and
   select an application according to the bending information,
   wherein, in response to a first aspect of the bending information being greater than a threshold value, the at least one control unit is further configured to:
   process, through the application, first image information corresponding to a first display object and a second display object to generate first image data; and
   drive the flexible display panel with the first image data to simulate, in proportion to the first aspect of the bending information, physical manipulation of the first display object that affects a path of the second display object relative to the first display object,
   wherein, in response to the first aspect of the bending information being greater than zero and less than or equal to the threshold value, the at least one control unit is further configured to:
   process, apart from the application, second image information to generate second image data based on at least a second aspect of the bending information, the second aspect being different from the first aspect; and drive the flexible display panel with the second image data, and wherein the first aspect is a bending velocity.

2. The flexible display device of claim 1, wherein:
each of the first spatial information and the second spatial information comprises at least one of a coordinate and an angle.

3. The flexible display device of claim 2, wherein the at least one control unit is further configured to:
determine, based on the first spatial information and the second spatial information, an intermediate value corresponding to at least one of a coordinate difference between the first portion and the second portion and an angular difference between the first portion and the second portion; and
determine the bending information based on the intermediate value.

4. The flexible display device of claim 3, wherein:
the bending information comprises the bending velocity and at least one of an amount of bending and a bending acceleration.

5. The flexible display device of claim 4, wherein the at least one control unit is further configured to:
receive temporal information; and
determine the bending information based on the temporal information and the intermediate value.

6. The flexible display device of claim 1, wherein:
the first spatial information and the second spatial information comprise at least one of a velocity, an angular velocity, an acceleration, and an angular acceleration.

7. The flexible display device of claim 6, wherein the at least one control unit is further configured to:
determine, based on the first spatial information and the second spatial information, an intermediate value corresponding to at least one of a velocity difference and an acceleration difference between the first portion and the second portion; and
determine the bending information based on the intermediate value.

8. The flexible display device of claim 1, wherein:
the flexible display panel comprises a display area configured to display an image; and
the at least one control unit is configured to process the image information through the application based on the bending information to generate the first image data.

9. The flexible display device of claim 8, wherein:
the first image data or the second image data comprises third image data and fourth image data; and
the at least one control unit is configured to:
divide the display area into a first area and a second area based on the third image data and the fourth image data;
drive the flexible display panel to display a first image according to the third image data in the first area; and
drive the flexible display panel to display a second image according to the fourth image data in the second area.

10. The flexible display device of claim 9, further comprising:
a sensing unit configured to sense user interaction with the second area, wherein:
the second area is configured to display an interface image based on the fourth image data;
the sensing unit is configured to generate an input signal in response to sensation of the user interaction with the interface image; and
the at least one control unit is further configured to modify the first image based on the input signal.

11. The flexible display device of claim 1, wherein:
the first sensor and the second sensor comprise at least one of a translational motion sensor and a rotary motion sensor.

12. The flexible display device of claim 11, wherein:
the translational motion sensor comprises a gravitational acceleration sensor; and
the rotary motion sensor comprises a gyro sensor.

13. The flexible display device of claim 1, wherein:
the flexible display panel comprises a display area to display an image and a non-display area disposed outside the display area; and
the first sensor and the second sensor are disposed in the non-display area.

14. The flexible display device of claim 13, wherein:
the flexible display panel comprises an array substrate and an opposite substrate opposite the array substrate; and
the first sensor and the second sensor are disposed in at least one of the array substrate and the opposite substrate.

15. The flexible display device of claim 13, further comprising:
a first cover configured to support the flexible display panel therein; and
a second cover coupled to the first cover, the flexible display panel being disposed between the first cover and the second cover,
wherein the first sensor and the second sensor are disposed on at least one of the first cover and the second cover.

16. The flexible display device of claim 1, wherein:
the flexible display panel is configured to enable the first portion to be bent to face the second portion.

17. The flexible display device of claim 1, wherein:
the flexible display device comprises a plurality of the first sensors, a plurality of the second sensors, or a plurality of the first sensors and a plurality of the second sensors.

18. A method, comprising:
sensing first spatial information of a first portion of a flexible display device bent about an axis;
sensing second spatial information of a second portion of the flexible display device;
determining bending information of the flexible display device based on the first spatial information and the second spatial information; and
selecting an application based on the bending information,
wherein, in response to a first aspect of the bending information being greater than a threshold value, the method further comprises:
processing, via the application, first image information corresponding to a first object and a second object to generate first image data; and
driving the flexible display device using the first image data to simulate, in proportion to the first aspect of the bending information, physical manipulation of the first object that affects a path of the second object relative to the first object, wherein, in response to the first aspect of the bending information being greater than zero and less than or equal to the threshold value, the method further comprises:
- processing, apart from the application, second image information to generate second image data based on at least a second aspect of the bending information, the second aspect being different from the first aspect; and
- driving the flexible display device using the second image data, and
- wherein the first aspect is a bending velocity.

19. The method of claim 18, wherein:
each of the first spatial information and the second spatial information comprises at least one of a coordinate and an angle.

20. The method of claim 19, wherein determining the bending information comprises:
- determining, based on the first spatial information and the second spatial information, an intermediate value corresponding to at least one of a coordinate difference between the first portion and the second portion and an angular difference between the first portion and the second portion; and
- determining the bending information based on the intermediate value.

21. The method of claim 18, further comprising:
controlling at least one function of the application based on the bending information.

22. The method of claim 18, wherein driving the flexible display device using the first image data or the second image data comprises:
- causing, at least in part, the second portion to display an interactive interface based on at least some of the first image data or the second image data; and
- causing, at least in part, a display of the first portion to be modified based on at least one interaction with the interactive interface.

23. The method of claim 18, wherein driving the flexible display device using the first image data or the second image data comprises:
causing, at least in part, content displayed via the flexible display device to be modified in proportion to the bending information.

* * * * *